United States Patent [19]
Ernst et al.

[11] 4,358,768
[45] Nov. 9, 1982

[54] RADIO DIRECTION FINDER

[75] Inventors: Bernhard Ernst; Eckhard Schmengler; Hans Pichl, all of Munich, Fed. Rep. of Germany

[73] Assignee: Rohde & Schwarz GmbH & Co. KG, Fed. Rep. of Germany

[21] Appl. No.: 223,163

[22] Filed: Jan. 7, 1981

[30] Foreign Application Priority Data

Jan. 9, 1980 [DE] Fed. Rep. of Germany ....... 3000561

[51] Int. Cl.³ .............................................. G01S 5/02
[52] U.S. Cl. .................................................... 343/118
[58] Field of Search ................... 343/106 R, 115, 118, 343/120, 113 R

[56] References Cited

U.S. PATENT DOCUMENTS

| | | | |
|---|---|---|---|
| 4,148,034 | 4/1979 | Cooney | 343/106 D |
| 4,257,047 | 3/1981 | Lipsky | 343/118 |

FOREIGN PATENT DOCUMENTS

| | | |
|---|---|---|
| 1204288 | 5/1966 | Fed. Rep. of Germany . |
| 2613055 | 6/1979 | Fed. Rep. of Germany . |

Primary Examiner—Theodore M. Blum
Attorney, Agent, or Firm—Hill, Van Santen, Steadman, Chiara & Simpson

[57] ABSTRACT

A radio direction finder for obtaining the bearing of a transmitter with respect to a receiver comprises a multi-element receiving antenna, two separate scanning means coupled to said antenna for simultaneously generating a rightward and a leftward rotating antenna pattern of the same rotating frequency, and two separate receivers having approximately the same group delay. Also included are demodulating means for generating two separate bearing signals of AM or FM-type modulation for the rightward and leftward rotating antenna pattern, respectively, and evaluator and indicator means for obtaining the bearing of a signal received by the antenna from the phases of the two bearing signals and a reference signal. As a result, the radio direction finder provided, being of the most simple structure, permits quick evaluation of the bearing, for instance, during one revolution only of the antenna characteristic, and yet includes no bearing errors caused by delay.

3 Claims, 3 Drawing Figures

RADIO DIRECTION FINDER

BACKGROUND OF THE INVENTION

The invention relates to a radio direction finder with which the bearing angle is obtained from the phase position of the AM or FM/PM-type modulation of bearing signals which result from the simulated rotation of the diagram of a bearing antenna. For compensating bearing errors caused by delay, a scanning means associated with the antenna and a receiver means connected to the output end of the scanning means for the rightward and leftward rotation of the antenna diagram, simultaneously provide two separate bearing signals at the same rotating frequency. On the basis of these signals an evaluator and indicator means determines the direction of incidence.

DESCRIPTION OF THE PRIOR ART

Radio direction finders of this kind are known (German Pat. Nos. 12 04 288 and 26 13 055, U.S. Pat. No. 4,148,034). The scanning processes effected in opposite directions afford the greatest possible compensation of bearing errors caused by delay differences in the leads and in the receiver channels. If the two scanning procedures for rightward and leftward rotation are effected one after the other, the bearing cannot be determined until a complete cycle of a plurality of rotations in opposite directions is completed, in other words after a rather long time. This disadvantage is the same if the known technique is applied of having the two scanning procedures effected by the same rotation scanning means at the same time and at the same frequency of rotation and actually determining the bearing in accordance with the minimum bearing principle i.e. tuning to zero the phase modulation which serves as bearing information (claim 5 of German Pat. No. 26 13 055). In this case, too, several rotations are required to obtain a bearing result.

Another known technique, namely once more to effect the two scanning procedures simultaneously by the same rotational scanning means but at different frequencies of rotation and to separate the courses in time of the two phases of the two rotations in the evaluating circuit by frequency-selective means (claim 4 of German Pat. No. 26 13 055), although theoretically affording shorter bearing times, again has the disadvantage that the bearing error due to the delay is not compensated as it is composed of the product of group delay and rotation frequency. Therefore, even if the delay is the same, the different frequencies of rotation again cause a bearing error so that this known technique does not achieve the above mentioned advantages of bearing error compensation.

SUMMARY OF THE INVENTION

It is, therefore, the object of the instant invention to provide a radio direction finder of the kind defined initially which is of extremely simple structure.

It is another object of the invention to provide a radio direction finder which will permit quick evaluation of the bearing, for instance, during one rotation only of the antenna characteristic.

It is yet another object of the invention to provide a radio direction finder producing results from which bearing errors caused by delay are eliminated.

A radio direction finder according to the invention comprises a multi-element receiving antenna, two separate scanning means coupled to said antenna for simultaneously generating a rightward and a leftward rotating antenna pattern of the same rotating frequency, two separate receivers having approximately the same group delay and including demodulating means for generating two separate bearing signals of AM or FM-type modulation for the rightward and leftward rotating antenna pattern, respectively, and evaluator and indicator means for obtaining the bearing of a signal received by the antenna from the phases of the two bearing signals and a reference signal.

A particularly simple and clear indication of a bearing value is obtained, in accordance with the invention if the radio direction finder further comprises means for forming the sum of and the difference between the two simultaneously generated bearing signals, means for the 90° shifting of one of said bearing signals, and means for applying the sum signal to one deflection system and the difference signal to the other deflection system of a coordinate indication system, and means for applying the reference signal in proper phase to the Z-control system of the coordinate indication system.

With the radio direction finder according to the invention the two scanning procedures for rightward and leftward rotation are effected by two separate scanning means. This makes it possible to process the high frequency bearing information thus produced of the rightward and leftward rotation in two separate receiving channels and then apply them separately to the evaluator and indicator means in which the direction of incidence will be determined in per se known manner. As the simultaneous scanning provides the bearing signals at the same time, the direction of incidence can be determined after only a single rotation. This permits extremely rapid evaluation and indication. Furthermore, as the simultaneous scanning is effected at the same frequency of rotation and the processing takes place in two separate receiving channels, the radio direction finder according to the invention also encompasses the known favorable properties for compensating bearing errors induced by delay. In accordance with modern circuitry techniques, the two separate receiving channels can be produced in simple manner with practically the same group delay. Consequently, there is no risk that this would substantially deteriorate the bearing error compensation.

BRIEF DESCRIPTION OF THE DRAWINGS

Other objects, features, and advantages of the invention will be more clearly understood from the following description, when read together with the accompanying drawing, in which.

DESCRIPTION OF THE PREFERRED EMBODIMENT

Figure 1:
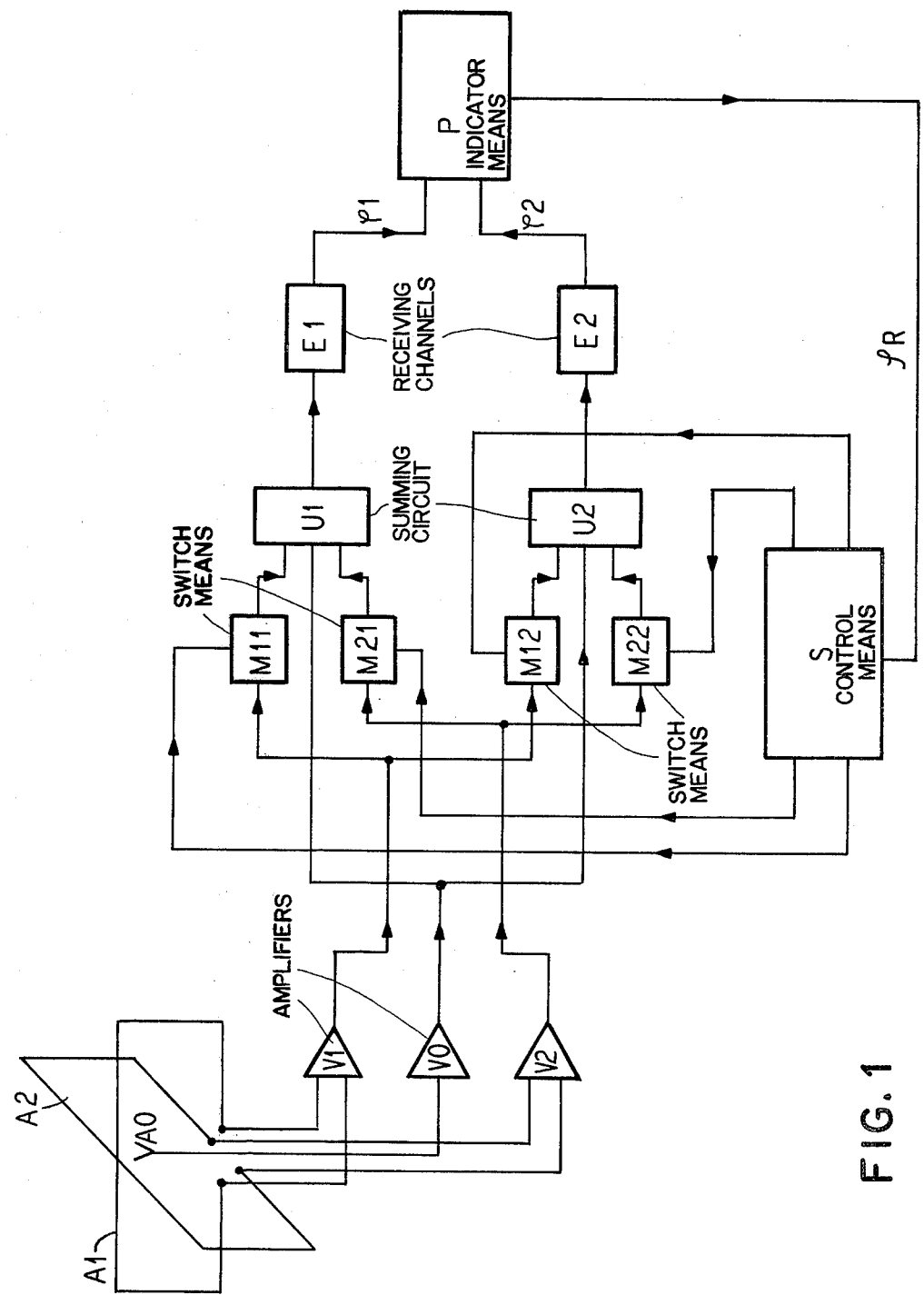
FIG. 1 is a block diagram of a radio direction finder according to one embodiment of the invention, comprising a rotating AM antenna characteristic.

FIG. 1 diagrammatically shows a rotational radio direction finder in accordance with the invention, comprising a simultaneously counter-rotating AM antenna characteristic (cardioid). In the embodiment shown, two antenna systems A1 and A2 are provided which are disposed perpendicularly with respect to each other to make the representation simple. Of course, a radio direction finder according to the invention may comprise a great variety of antennas in any desired number. The signals received by both antennas A1 and A2 and by an additional auxiliary antenna A0 which in known manner provides a reference signal, are amplified in amplifiers V1, V2, and V0 and then applied to two separate scanning means, each consisting of the switch means M11 and M21 and M12 and M22, respectively. These switch means M are controlled by a control means S so as to provide rotation of the antenna characteristic (double circle diagram) in one direction of rotation, for example leftward rotation, by consecutive reversals of the two switch means M11 and M21, and to provide rotation of the same antenna characteristic in the opposite direction, for instance rightward rotation, by way of the other two switch means M12 and M22. The switch means M for rightward and leftward rotation are subjected to the same switch-over frequency so that the rotation is effected at the same frequency as well. Instead of switching means, modulators may be used to afford smoother switch-over and thus a softer transition from one antenna or another. The outputs of the two scanning means for rightward and leftward rotation, combined in summing circuits U1 and U2, and including in per se known manner also the signal of the auxiliary antenna A0 for forming the cardioid characteristic, are applied to two separate receiving channels E1 and E2, respectively, having the same group delay. Here the signals of the leftward rotation and of the rightward rotation, respectively, are amplified separately and processed and finally demodulated, providing at the output of receiving channel E1 a bearing signal $\phi 1$, preferably of sine-shape, and at the output of receiving channel E2 a bearing signal $\phi 2$ for subsequent evaluation and determination of the direction of incidence in an evaluator and indicator means P. The two bearing signals $\phi 1$ and $\phi 2$ have the same frequency because of the same frequency of rotation. The signals are evaluated in the evaluation means P in known manner, taking into consideration a reference signal $\phi R$ generated by the control means S in synchronism with the frequency of rotation. In the evaluation means, the direction of incidence of the transmitter which is subject to the bearing, is determined in known manner on the basis of the phase difference of the two bearing signals $\phi 1$ and $\phi 2$; and the unambiguity of this result is confirmed by means of the reference signal $\phi R$.

Figure 2:
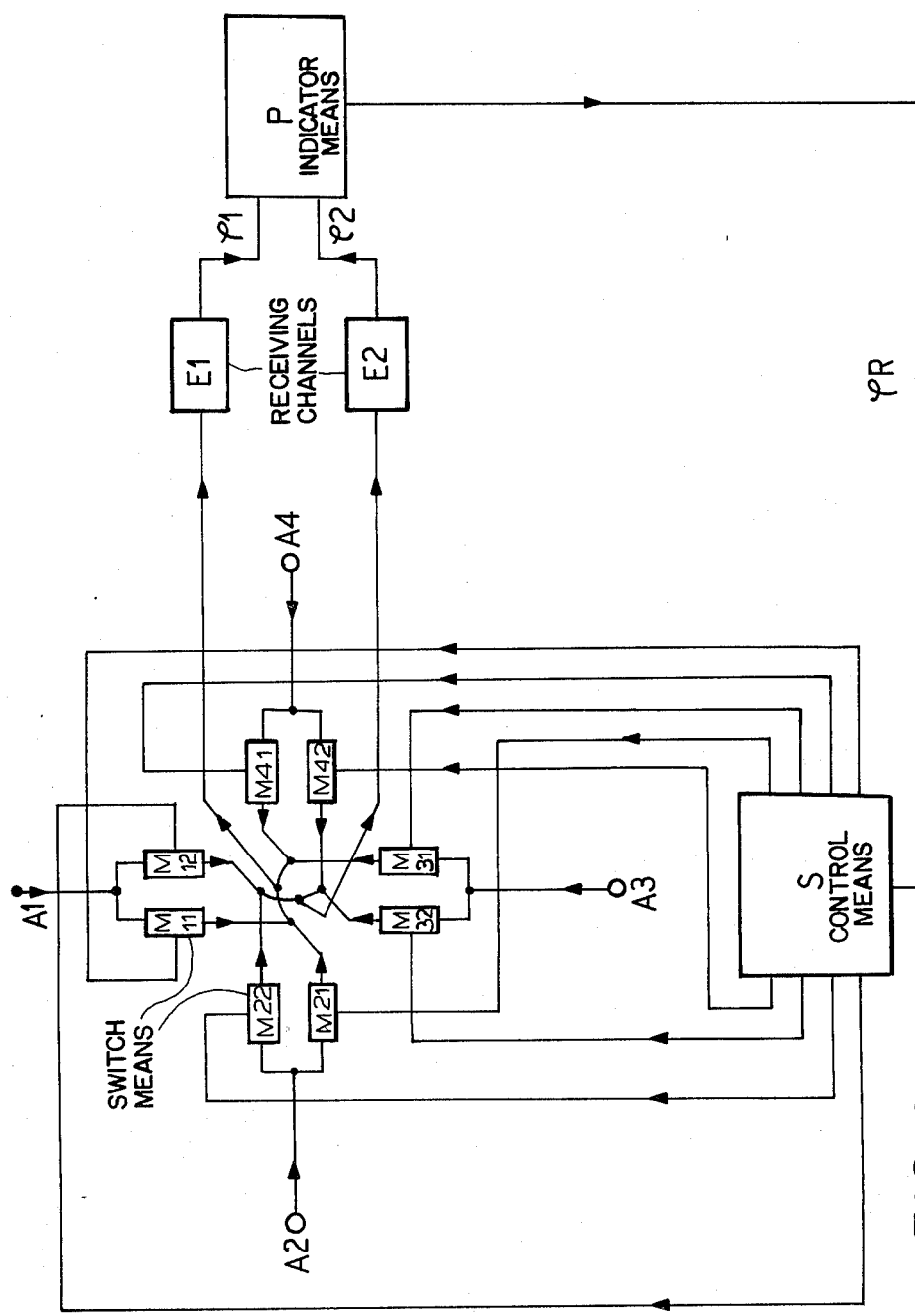
FIG. 2 is a block diagram of another embodiment of a radio direction finder according to the invention, comprising a rotating FM antenna characteristic (Doppler bearing system)

FIG. 2 diagrammatically shows a rotational radio direction finder, comprising a rotating PM or FM antenna characteristic (Doppler bearing system). For the sake of simplicity, only four antennae A1 to A4 are provided although, of course, again the actual number may be greater. Two separate rotary scanning means are provided, one being constituted by switch means M11, M21, M31, and M41 and the other one, for causing rotation in opposite direction of the antenna characteristic by switch means M12, M22, M32, and M42. These switch means are controlled at the same frequency by control means S. The switch means again may be replaced by modulators. The output of the one scanning means (combined outputs of switch means M11, M21, M31, M41) is connected with a receiving means E1, while the output of the other scanning means (combined outputs of switch means M12, M22, M32, M42) is connected with the input of a second separate receiving channel E2. In known manner, these two receiving channels E1 and E2a each form a bearing signal $\phi 1$ and $\phi 2$, respectively, preferably of sine-shape and of the same frequency, by FM demodulation. Based on these bearing signals, and by forming the phase difference thereof, the evaluation means P determines the direction of incidence, in consideration of the reference signal $\phi R$.

Figure 3:
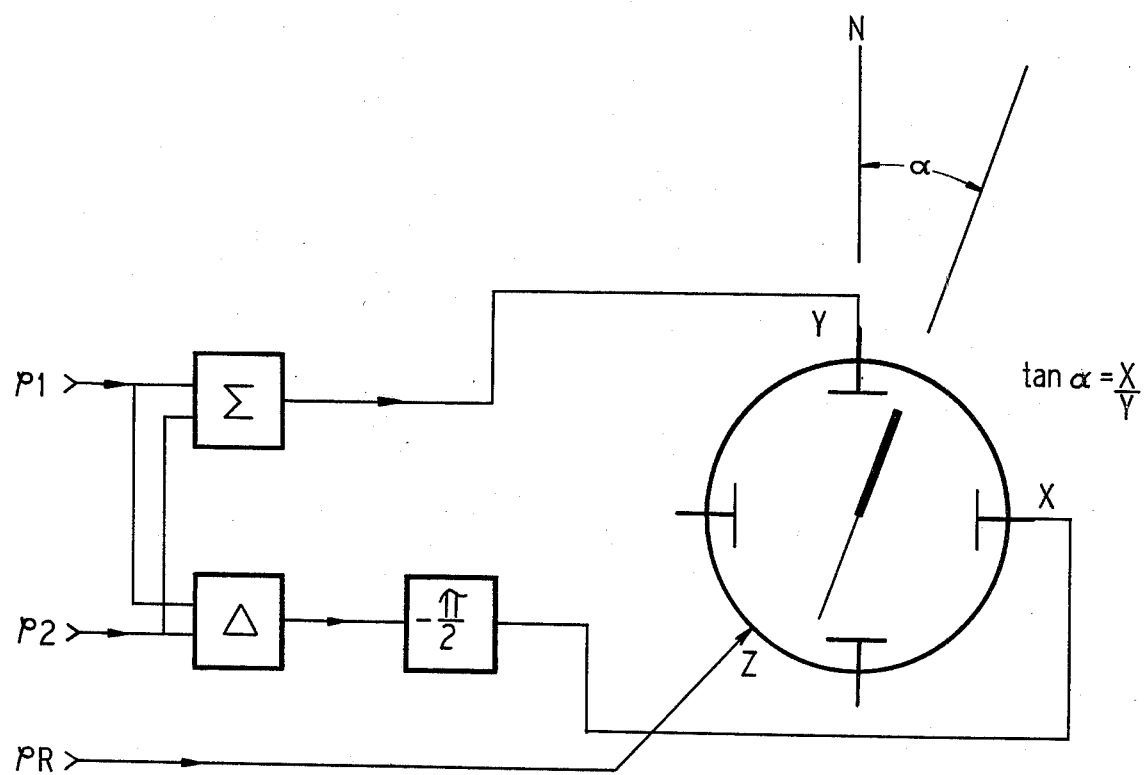
FIG. 3 is a diagrammatic presentation of details of an evaluating and indicating means in accordance with the invention.

The technique according to the invention of producing the two bearing signals $\phi 1$ and $\phi 2$ at the same time and at the same frequency of rotation permits a particularly simple structure of the evaluating and indicating means, such as shown in FIG. 3. A summing circuit on the one hand forms the sum signal $\phi 1 + \phi 2$, based on the two bearing signals $\phi 1$ and $\phi 2$, while a difference circuit forms the difference signal $\phi 1 - \phi 2$. The sum or difference signal then is displaced in phase by $\pm \pi/2$ by a phase shifter. Then the difference signal is applied to the X deflection system and the sum signal to the Y deflection system of a cathode ray tube. The mathematical derivation in accordance with FIG. 3 directly provides the bearing angle $\alpha$, appearing as a line on the screen of the cathode ray tube. As the full 360° C. of the screen circle are utilized, the display at first is ambiguous. Therefore, the synchronous reference signal $\phi R$ is additionally applied, in correct phase (0° or 180°, as results from the equation of FIG. 3) to the Z channel of the cathode ray tube. In this manner the incorrect bearing direction is faded out by dark control of the cathode ray. Therefore, finally only the somewhat more accentuated line is shown which clearly indicates the bearing direction $\alpha$. This type of bearing indication is effected with a minimum of inertia and, to a certain extent, also permits judgement of the bearing quality because field distortions by reflectors or interferences of two transmitters become visible on the screen. Furthermore, this kind of indicator means has the advantage that the length of the line is an indication of the angle of elevation, in other words of the angle at which the bearing signal is incident in the oblique direction with respect to the actual bearing plane in which the antennas are disposed in ring-shape. Thus also the angle of elevation can be indicated on the screen by providing a corresponding scale, for instance in the form of concentric rings. Another possibility resides in gauging a controller for the length of the line. Instead of the cathode ray tube, of course, any other two- or three-coordinate indicating system, for example of mechanical structure may be employed.

Specific construction techniques for the control means S and the switching circuits M11, M21, M12, and M22 connected to control means S are illustrated in the previously mentioned German Pat. Nos. 1204288 and 2613055, and U.S. Pat. No. 4,148,034.

Although various minor modifications may be suggested by those versed in the art, it should be understood that we wish to embody within the scope of the patent warranted hereon, all such embodiments as reasonably and properly come within the scope of our contribution to the art.

What we claim is:
1. A radio direction finder comprising:
    a multi-element receiving antenna, two separate scanning means coupled to said antenna for simultaneously generating a rightward and a leftward rotating antenna pattern of the same rotating fre- quency, two separate receivers having approximately the same group delay and including demodulating means for generating two separate bearing signals of AM or FM-type modulation for the rightward and leftward rotating antenna pattern, respectively, and evaluator and indicator means for obtaining the bearing of a signal received by the antenna from the phases of the two bearing signals and a reference signal.

2. A radio direction as claimed in claim 1, comprising:
means for forming the sum of and the difference between the two simultaneously generated bearing signals, means for the 90° shifting of one of said bearing signals, and means for applying the sum signal to one deflection system and the difference signal to the other deflection system of a coordinate indication system.

3. The radio direction finder as claimed in claim 2, comprising:
means for applying the reference signal in proper phase to the Z-control system of the coordinate indication system.

* * * * *